(12) United States Patent
Foster (10) Patent No.: US 9,171,448 B1
(45) Date of Patent: Oct. 27, 2015

(54) RFID TAGS FOR LOCATING PRODUCTS
(71) Applicant: Target Brands, Inc., Minneapolis, MN (US)
(72) Inventor: Robert F. Foster, Ramsey, MN (US)
(73) Assignee: Target Brands, Inc., Minneapolis, MN (US)
( * ) Notice: Subject to any disclaimer, the term of this patent is extended or adjusted under 35 U.S.C. 154(b) by 0 days.
(21) Appl. No.: 14/301,664
(22) Filed: Jun. 11, 2014
(51) Int. Cl.
  *G08B 1/00* (2006.01)
  *G08B 21/24* (2006.01)
(52) U.S. Cl.
  CPC ...................................... *G08B 21/24* (2013.01)
(58) Field of Classification Search
  CPC ............... G06Q 10/087; G06Q 10/08; G06K 2017/0045; G06K 7/0008; G06K 17/00; G06K 17/0022; G06K 19/0723; G06K 2017/0051; G06K 7/10079; G08B 13/2462; G01S 13/878; G01S 13/74; G01S 13/751; G01S 13/765
  USPC ......... 340/8.1, 10.3, 10.32, 10.4, 10.41, 10.5, 340/572.1, 572.4, 539.2, 539.11, 539.13, 340/539.16, 539.32
  See application file for complete search history.

(56) References Cited

U.S. PATENT DOCUMENTS

| | | | | |
|---|---|---|---|---|
| 4,379,431 A * | 4/1983 | Clement | ................. | A47F 5/101 108/1 |
| 4,506,790 A * | 3/1985 | Muscari | .................. | A47F 5/116 108/180 |
| 4,673,932 A * | 6/1987 | Ekchian | ................. | G01S 13/753 235/385 |
| 4,862,160 A * | 8/1989 | Ekchian | ................. | G01S 13/753 340/10.32 |
| 5,458,411 A * | 10/1995 | Moss | ........................ | A47F 5/116 312/259 |
| 5,640,151 A * | 6/1997 | Reis | ........................ | G01S 13/74 340/10.2 |
| 5,686,902 A | 11/1997 | Reis et al. | | |
| 5,869,820 A * | 2/1999 | Chen | ................. | H01L 21/67294 235/376 |
| 5,920,261 A * | 7/1999 | Hughes | .................. | G01S 13/878 340/3.51 |
| 6,046,683 A * | 4/2000 | Pidwerbetsky | ........... | G01S 5/04 340/10.32 |
| 6,204,765 B1* | 3/2001 | Brady | ..................... | G01S 11/06 340/10.1 |
| 6,396,438 B1* | 5/2002 | Seal | ....................... | G01S 13/751 340/8.1 |
| 6,542,114 B1* | 4/2003 | Eagleson | ........... | G06K 17/0022 340/993 |
| 6,662,068 B1* | 12/2003 | Ghaffari | ............. | G06K 19/0723 700/115 |
| 6,915,135 B1* | 7/2005 | McKee | .................... | G01S 7/003 340/539.13 |
| 7,005,968 B1* | 2/2006 | Bridgelall | ............. | G01S 13/876 340/10.42 |
| 7,233,241 B2* | 6/2007 | Overhultz | ............... | A47F 10/02 211/59.2 |

(Continued)

FOREIGN PATENT DOCUMENTS

| CH | EP 1406207 A1 * | 4/2004 | ............. G06K 17/00 |
|---|---|---|---|
| EP | 1406207 A1 * | 4/2004 | ............. G06K 17/00 |

OTHER PUBLICATIONS

Joho et al., Modeling RFID Signal Strength and Tag Detection for Localization and Mapping, Proc. IEEE Int. Conf. on Robotics and Automation (ICRA). 2009.

(Continued)

*Primary Examiner* — Paul Obiniyi
(74) *Attorney, Agent, or Firm* — Theodore M. Magee; Westman, Champlin & Koehler, P.A.

(57) ABSTRACT

A computer-implemented method includes receiving a structure signal strength for a signal generated by a tag on a structure and receiving a product signal strength for a signal generated by a tag on a product. An indication that the product is positioned near the structure based on the received structure signal strength and the received product signal strength is then stored in memory.

14 Claims, 6 Drawing Sheets

(56) References Cited

U.S. PATENT DOCUMENTS

| | | | |
|---|---|---|---|
| 7,295,132 B2* | 11/2007 | Steiner | G01C 3/26 235/383 |
| 7,342,497 B2* | 3/2008 | Chung | G06Q 10/08 235/375 |
| 7,504,928 B2 | 3/2009 | Nierenberg et al. | |
| 7,584,048 B2* | 9/2009 | Pham | G01C 21/20 701/434 |
| 7,667,602 B2 | 2/2010 | Ulrich | |
| 7,701,348 B2* | 4/2010 | Kim | G06Q 10/08 340/572.4 |
| 7,775,430 B2* | 8/2010 | Lin | G06Q 30/06 235/375 |
| 7,839,289 B2 | 11/2010 | Chung et al. | |
| 7,928,844 B2* | 4/2011 | Mackenzie | G08B 13/2462 340/572.1 |
| 8,161,910 B2* | 4/2012 | Coiro, Sr. | A01K 1/031 119/417 |
| 8,339,243 B2* | 12/2012 | Shiau | G06K 7/0008 340/10.1 |
| 8,519,848 B2 | 8/2013 | Stern | |
| 2002/0038267 A1* | 3/2002 | Can | G06K 17/00 705/28 |
| 2002/0190845 A1* | 12/2002 | Moore | G06K 7/10336 340/10.3 |
| 2002/0196126 A1* | 12/2002 | Eisenberg | G06K 17/00 340/10.2 |
| 2003/0013146 A1* | 1/2003 | Werb | G01V 15/00 435/9 |
| 2003/0204453 A1* | 10/2003 | Kawamata | G06Q 30/06 705/28 |
| 2005/0075954 A1* | 4/2005 | Matsumoto | G06Q 10/087 705/28 |
| 2005/0242183 A1* | 11/2005 | Bremer | G06K 7/10316 235/439 |
| 2006/0022824 A1* | 2/2006 | Olsen, III | B07C 7/005 340/572.1 |
| 2006/0068701 A1* | 3/2006 | Chapman | G06K 7/10465 455/41.1 |
| 2006/0082440 A1* | 4/2006 | Glaser | G06Q 20/201 340/5.91 |
| 2006/0082457 A1* | 4/2006 | Artem | G06Q 10/06 340/572.1 |
| 2006/0125604 A1* | 6/2006 | Vaiana | G06Q 30/00 340/10.41 |
| 2006/0255133 A1* | 11/2006 | Takano | G06Q 20/20 235/383 |
| 2007/0095911 A1* | 5/2007 | Shimura | G06K 7/0004 235/440 |
| 2008/0055084 A1* | 3/2008 | Bodin | G06Q 10/08 340/572.1 |
| 2008/0061967 A1* | 3/2008 | Corrado | G06K 7/10079 340/539.26 |
| 2008/0079577 A1* | 4/2008 | Malik | G06K 7/10356 340/572.1 |
| 2008/0106399 A1* | 5/2008 | Yaqub | G08B 13/1427 340/539.11 |
| 2008/0117025 A1* | 5/2008 | Tuttle | G06K 7/0008 340/10.3 |
| 2008/0129461 A1* | 6/2008 | Abraham | G06K 7/0008 340/10.1 |
| 2008/0180246 A1* | 7/2008 | Malik | G06K 7/0008 340/572.1 |
| 2008/0204200 A1* | 8/2008 | Zhu | G01S 5/02 340/10.3 |
| 2008/0238682 A1* | 10/2008 | Kuwako | G06K 7/0008 340/572.4 |
| 2009/0002154 A1* | 1/2009 | Ryan | G08B 21/24 340/539.16 |
| 2009/0040027 A1* | 2/2009 | Nakao | G06K 19/0701 340/10.5 |
| 2009/0127461 A1* | 5/2009 | Holcombe | H04B 10/116 250/338.1 |
| 2009/0201169 A1* | 8/2009 | D'Hont | G01S 13/878 340/8.1 |
| 2010/0134276 A1* | 6/2010 | Zaruba | G01S 5/0257 340/539.13 |
| 2010/0148985 A1* | 6/2010 | Lin | G06K 7/10356 340/8.1 |
| 2010/0156599 A1* | 6/2010 | Ainsbury | G01S 5/0278 340/10.1 |
| 2010/0164710 A1* | 7/2010 | Chung | G01S 5/0018 340/539.1 |
| 2010/0237994 A1* | 9/2010 | Carraher | H04L 41/12 340/10.1 |
| 2011/0025461 A1* | 2/2011 | Nobutsugu | G07G 1/009 340/5.92 |
| 2011/0043373 A1* | 2/2011 | Best | G01S 1/68 340/8.1 |
| 2011/0109169 A1* | 5/2011 | Shimamoto | G06K 7/0008 307/104 |
| 2012/0062381 A1* | 3/2012 | Liu | G01S 11/06 340/572.1 |
| 2012/0127976 A1 | 5/2012 | Lin et al. | |
| 2012/0161967 A1* | 6/2012 | Stern | G06K 7/10366 340/572.1 |
| 2012/0193415 A1 | 8/2012 | Coiro, Sr. et al. | |
| 2012/0197729 A1* | 8/2012 | Bertram | G06Q 30/02 705/14.64 |
| 2013/0154809 A1* | 6/2013 | Subramanian | G01S 13/878 340/10.42 |
| 2013/0310967 A1* | 11/2013 | Olson | G06Q 10/087 700/214 |
| 2014/0084060 A1* | 3/2014 | Jain | G06Q 10/087 235/385 |

OTHER PUBLICATIONS

Lionel et al., LANDMARC: Indoor Location Sensing Using Active RFID, Wireless Networks 10, 701-710, 2004.

Zhang et al., Principles and Techniques of RFID Positioning, Chapter 15 of RFID Systems: Research Trends and Challenges, Villanova University, published online 2010.

* cited by examiner

RFID TAGS FOR LOCATING PRODUCTS

BACKGROUND

Radio frequency identification (RFID) utilizes small tags, each containing electronics and an antenna that are capable of broadcasting a radio signal that identifies the tag. Such RFID tags can be active or passive. An active RFID tag includes a battery that allows the tag to periodically generate the radio signal. A passive RFID tag does not include an internal battery but instead is powered by an interrogator signal received by the tag's antenna. The power provided by the interrogator signal can be used immediately by the tag to provide a response signal or can be stored in a capacitor in the tag to be used later.

The radio signals generated by RFID tags are received and decoded by RFID readers. The RFID reader decodes the signal it receives to produce an identifier of the RFID tag found in the signal. Some RFID readers are also able to determine the strength of the radio signal received from the RFID tag. In such readers, the strength of the signal can be provided as an output known as a Received Signal Strength Indicator (RSSI).

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes receiving a structure signal strength for a signal generated by a tag on a structure and receiving a product signal strength for a signal generated by a tag on a product. An indication that the product is positioned near the structure based on the received structure signal strength and the received product signal strength is then stored in memory.

A system includes a merchandise tag on a piece of merchandise, a structure tag on a product support structure, and a tag reader that receives signals from the merchandise tag and the structure tag and identifies a strength of the signal received from the merchandise tag and a strength of the signal received from the structure tag. A computing device receives from the tag reader the strength of the signal received from the merchandise tag and the strength of the signal received from the structure tag and identifies a location of the piece of merchandise based on the strengths of the signals.

A retail store has a product radio transceiver mounted on a product, a storage area radio transceiver mounted in a storage area, a sales area radio transceiver mounted in a sales area, and a radio signal amplitude detector providing amplitudes of signals from the product radio transceiver, the storage area radio transceiver, and the sales area radio transceiver. A product locator identifies a location of the product in the retail store based on the amplitudes of signals from the product radio transceiver, the storage area radio transceiver, and the sales area radio transceiver.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments described herein use a Received Signal Strength Indicator (RSSI) of a signal generated by an RFID tag to determine the location of the RFID tag. In particular, the embodiments compare the RSSI of an RFID tag on a product to the RSSIs of RFID tags placed on structures in the environment. The RFID tag on the product is considered to be located near the structure RFID tag that has the most similar RSSI value. Using this system, it is possible to determine whether a product is located in a backroom or on a sales floor.

In the past, the RSSI of an RFID tag has been used to determine the distance between the RFID interrogator-reader and the RFID tag. However, such information has limited accuracy due to variations in the directional signal strength of the RFID interrogator-reader and the RFID tag. In particular, in certain directions, the RFID interrogator-reader generates a larger interrogator signal than in other directions. Similarly, the RFID tag generates a larger response signal in certain directions than in other directions. As a result, RSSI values can change even though the RFID tag is the same distance from the RFID interrogator-reader simply by changing the angular position of the RFID tag relative to the RFID interrogator-reader. Thus, it has been difficult to use RSSI to identify a location of a product.

Figure 1:
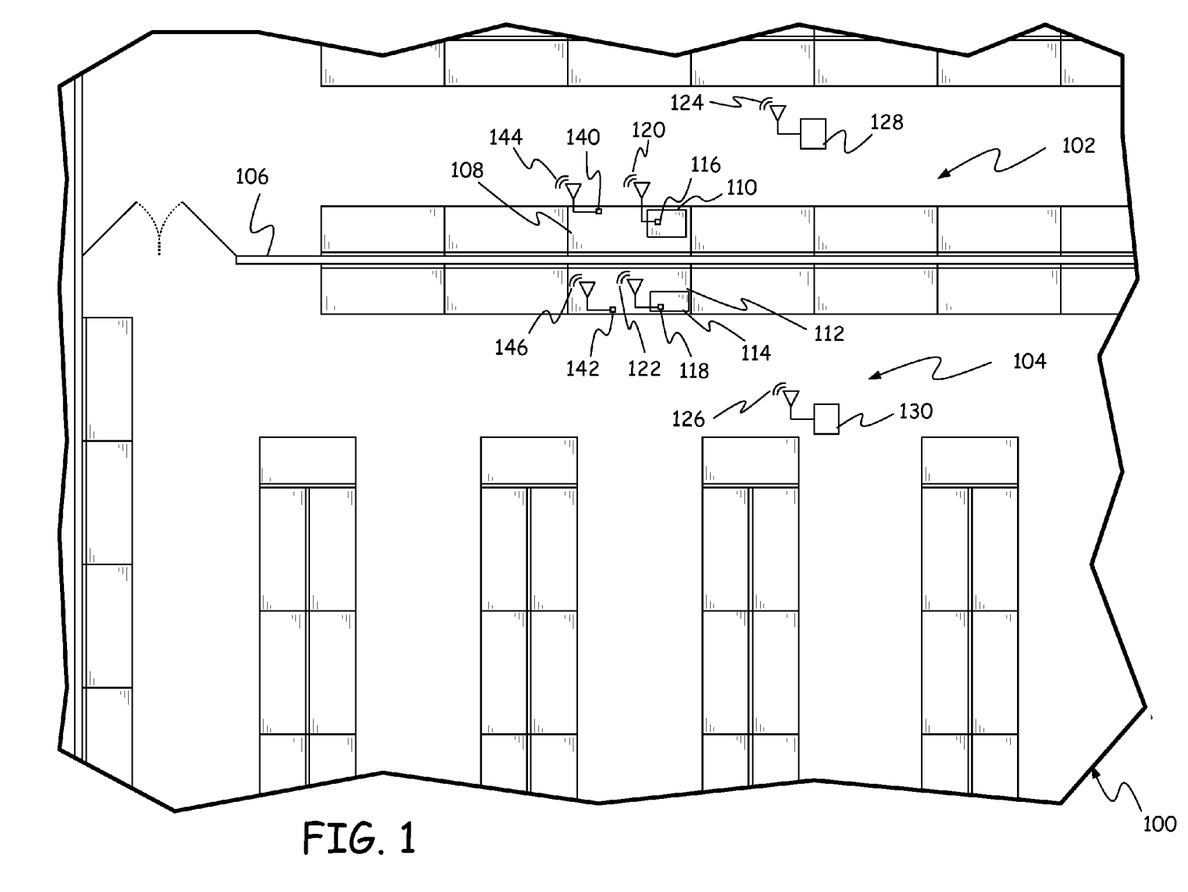
FIG. 1 is a plan view of a retail store providing an exemplary environment in which embodiments may be practiced.

FIG. 1 provides a plan view of a portion of a retail environment/retail store 100 in which some embodiments may be practiced. Retail environment 100 includes a backroom or storage area 102 and a sales floor or sales area 104 that are separated by a building wall 106. Storage area 102 includes product support structures or shelving units, such as shelving unit 108, that support products or merchandise, such as product or piece of merchandise 110, while they are being stored. Sales area 104 includes product support structures or shelving units, such as shelving unit 112, that support products or merchandise, such as product or piece of merchandise 114, when they are displayed for sale. Storage area 102 and sales area 104 each include a large number of product support structures that define one or more aisles for moving between the product support structures.

Products 110 and 114 include RFID tags 116 and 118, respectively. RFID tags 116 and 118 generate radio signals 120 and 122, respectively, using internal antennae, which are shown in an exaggerated form in FIG. 1 for the purposes of illustration only. In practice, the antenna for a tag is internal to the tag. Radio signals 120 and 122 are generated in response to radio signals 124 and 126 generated by RFID interrogator-readers 128 and 130. RFID interrogator-reader 128 is positioned in storage area 102 and RFID interrogator-reader 130 is positioned in sales area 104. RFID interrogator-reader 128 receives radio signal 120 from product 110 and decodes the radio signal to generate an identifier for RFID tag 116 and an RSSI value representing the strength of the signal received by RFID interrogator-reader 128. Similarly, RFID interrogator-reader 130 receives radio signal 122 from RFID tag 118 and decodes the signal to generate an identifier for RFID tag 118. RFID interrogator-reader 130 also determines an RSSI value for radio signal 122 indicating the strength of the signal at interrogator-reader 130.

Radio signal 120 from RFID tag 116 is also transmitted through wall 106 and is received by RFID interrogator-reader 130. Similarly, radio signal 122 from RFID tag 118 is transmitted through wall 106 and is received by RFID interrogator-reader 128. RFID interrogator-reader 128 decodes radio signal 122 to determine the identifier for RFID tag 118 and generates an RSSI value for radio signal 122 at RFID interrogator-reader 128. Similarly, RFID interrogator-reader 130 decodes radio signal 120 to produce an identifier for RFID tag 116 and generates an RSSI value for radio signal 120 at RFID interrogator-reader 130. Thus, even though RFID interrogator-reader 128 is positioned in storage area 102, it can receive radio signals from RFID tags on products in sales area 104. Similarly, even though RFID interrogator-reader 130 is positioned in sales area 104, it can receive radio signals from RFID tags on products in storage area 102. As a result, if the system relied on the reception of an RFID signal by RFID interrogator-reader 128 as an indication that an RFID tag that generated the signal is in storage area 102, the system would mistakenly believe that RFID tag 118 and product 114 were within storage area 102 when in fact they are in sales area 104. Similarly, if the system relied on the reception of radio signal 120 at RFID interrogator-reader 130 as an indication that RFID tag 116 is located in sales area 104, the system would mistakenly believe that product 110 was located in sales area 104 instead of storage area 102.

To avoid this confusion, the embodiments disclosed herein provide additional RFID tags that are mounted to physical structures within retail environment 100. In particular, in storage area 102 an RFID tag 140 is mounted to shelving unit 108 and in sales area 104, an RFID tag 142 is mounted on display shelving unit 112. RFID tag 140 receives interrogator radio signals 124 and 126 from RFID interrogator-readers 128 and 130 and in response to those signals generates radio signal 144, which may be received by both RFID interrogator-reader 128 and RFID interrogator-reader 130. Similarly, RFID tag 142 receives interrogator radio signals 124 and 126 and in response generates radio signal 146, which is received by RFID interrogator-reader 128 and RFID interrogator-reader 130. In FIG. 1, the antennae of tags 140 and 142 are shown in an exaggerated form for the purposes of illustration only. In practice, each antenna is encapsulated within its respective tag.

RFID interrogator-reader 128 and RFID interrogator-reader 130 are able to decode radio signals 144 and 146 from RFID tags 140 and 142 to determine the identity of the RFID tags and are able to generate an RSSI value for radio signals 144 and 146 at RFID interrogator-reader 128 and RFID interrogator-reader 130, respectively. By comparing the RSSI values of the signals generated by structure RFID tags 140 and 142 with the RSSI values of the signals generated by RFID tags 116 and 118, it is possible to determine the location of RFID tags 116 and 118 relative to the location of RFID tags 140 and 142. As such, it is possible to determine whether a product such as product 110 or product 114 is in storage area 102 or sales area 104.

Figure 2:
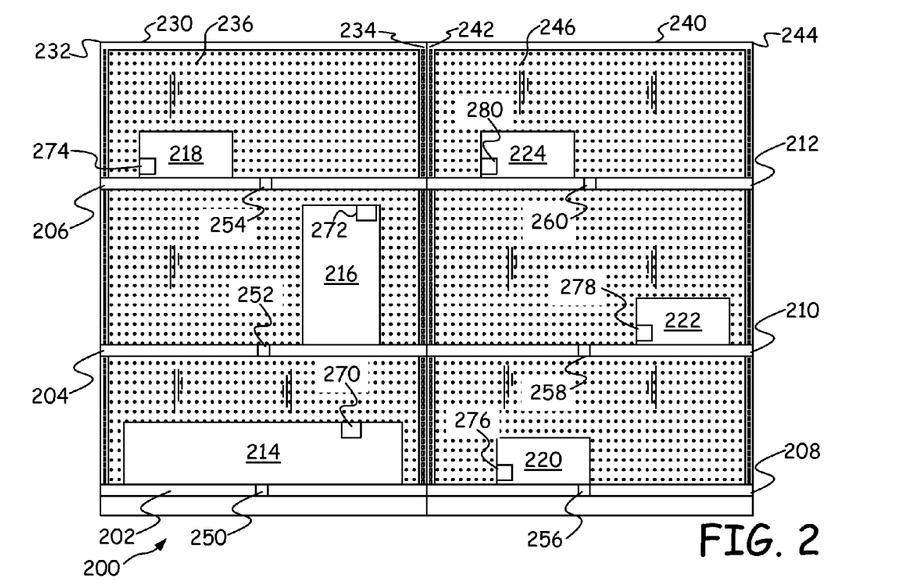
FIG. 2 is a front view of a shelving unit in accordance with one embodiment.

FIG. 2 provides a front view of an exemplary shelving unit 200, which can be utilized as shelving unit 108 or shelving unit 112 in FIG. 1. Shelving unit 200 includes shelves 202, 204, 206, 208, 210 and 212, which support products 214, 216, 218, 220, 222 and 224. Although only a single product is shown on each shelf, those skilled in the art will recognize that multiple products may be placed on each shelf.

Shelves 202, 204 and 206 are support by a frame 230 having two uprights 232 and 234. A back panel 236 is positioned within frame 230. Similarly, shelves 208, 210 and 212 are supported by a frame 240 having uprights 242 and 244 with a back panel 246 supported within frame 240. Shelves 202, 204 and 206 have mounted thereon RFID tags 250, 252 and 254. Shelves 208, 210 and 212 have mounted thereon RFID tags 256, 258 and 260. RFID tags 250, 252, 254, 256, 258 and 260 in one embodiment are passive RFID tags that can receive an interrogator signal, use the signal to power electronics within the RFID tag and generate a response signal that at least identifies the RFID tag. Products 214, 216, 218, 220, 222 and 224 include RFID tags 270, 272, 274, 276, 278 and 280, which in one embodiment are also passive RFID tags.

RFID tags 250, 252, 254, 256, 258 and 260 are shown as being mounted to a front surface of their respective shelves. In other embodiments, the RFID tags may be mounted on other surfaces of the shelves such as the tops and bottoms of the shelves. In addition, RFID tags 250, 252, 254, 256, 258 and 260 may be horizontally centered on the respective shelves as shown. This centering provides more accurate position information for the products.

Figure 3:
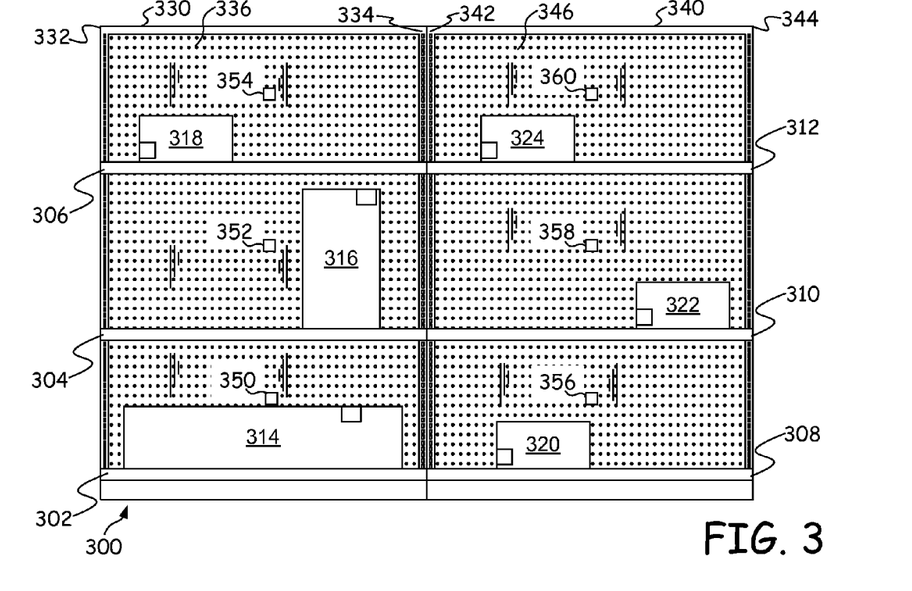
FIG. 3 is a front view of a shelving unit in accordance with a second embodiment.

FIG. 3 provides an alternative embodiment of a shelving unit 300, which can be used as shelving units 108 and 112 in FIG. 1. Shelving unit 300 includes shelves 302, 304, 306, 308, 310 and 312. Shelves 302, 304, 306, 308, 310 and 312 support products 314, 316, 318, 320, 322 and 324, respectively. Although only a single product is shown on each shelf, those skilled in the art will recognize that multiple products may be placed on each shelf.

Shelves 302, 304 and 306 are supported by a frame 330 that includes two uprights 332 and 334 with a back panel 336 inserted in frame 330. Shelves 308, 310 and 312 are supported by a frame 340 that includes uprights 342 and 344 with a back panel 346 inserted within frame 340. RFID tags 350, 352 and 354 are mounted on back panel 336 while RFID tags 356, 358 and 360 are mounted on back panel 346. In particular, RFID tag 350 is mounted to back panel 336 between shelves 302 and 304; RFID tag 352 is mounted to back panel 336 between shelves 304 and 306; and RFID tag 354 is mounted to back panel 336 above shelf 306. In the embodiment of FIG. 3, RFID tags 350, 352 and 354 are centered horizontally along shelves 302, 304 and 306 with tag 350 vertically centered between shelves 302 and 304, tag 352 vertically centered between shelves 304 and 306 and tag 354 vertically centered between shelf 306 and a top of frame 330. Similarly, tags 356, 358 and 360 are horizontally centered on respective shelves 308, 310 and 312 with tag 356 vertically centered between shelves 308 and 310, tag 358 vertically centered between shelves 310 and 312, and tag 360 vertically centered between shelf 312 and a top of frame 340. The positions of the RFID tags shown in FIG. 3 provide a more accurate determination of where the products are located. However, the RFID tags may be placed anywhere on the back panels and on either a front or a back of the back panels.

Figure 4:
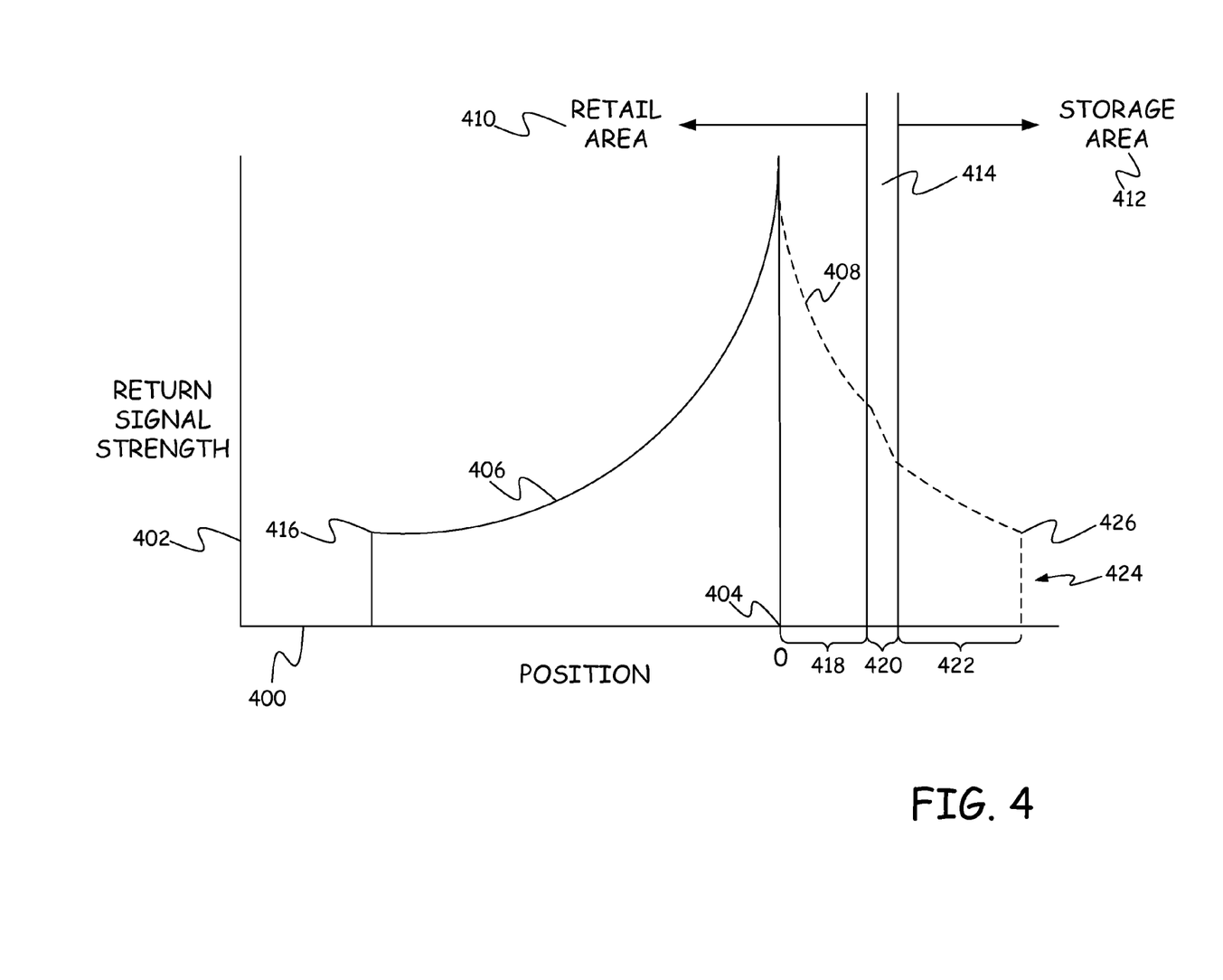
FIG. 4 is a graph of received signal strength as a function of a position of a single RFID tag.

FIG. 4 provides graphs 406 and 408 showing received signal strength from a passive RFID tag as a function of the position of the RFID interrogator-reader relative to the RFID tag. In FIG. 4, possible positions for the RFID tag are shown on horizontal axis 400 and the received signal strength is shown on vertical axis 402. The position of the RFID tag is shown as position 404. In FIG. 4, the RFID tag is positioned in a retail area 410 that is separated from a storage area 412 by wall 414. Graph 406 shows the relative strength of the RFID tag radio signal as a function of distance from the RFID tag in a direction away from wall 414 and into retail area 410. Graph 408 shows the strength of the radio signal of the RFID tag in a second direction toward and through wall 414 and into storage area 412.

In FIG. 4, it can be seen that graph 406 is a smooth curve until a point 416 at which it suddenly drops to 0. Point 416 corresponds to a point at which the RFID tag does not receive a large enough interrogator signal to generate a response signal. Graph 408 has four sections: 418, 420, 422 and 424. Section 418 has a similar shape to graph 406. In section 420, the strength of the radio signal drops substantially due to passing through wall 414. Section 422 represents a continued propagation of the radio signal through air. At point 426, the RFID tag no longer receives a large enough interrogator signal to generate a response signal causing section 424 of the graph to drop to 0.

Figure 5:
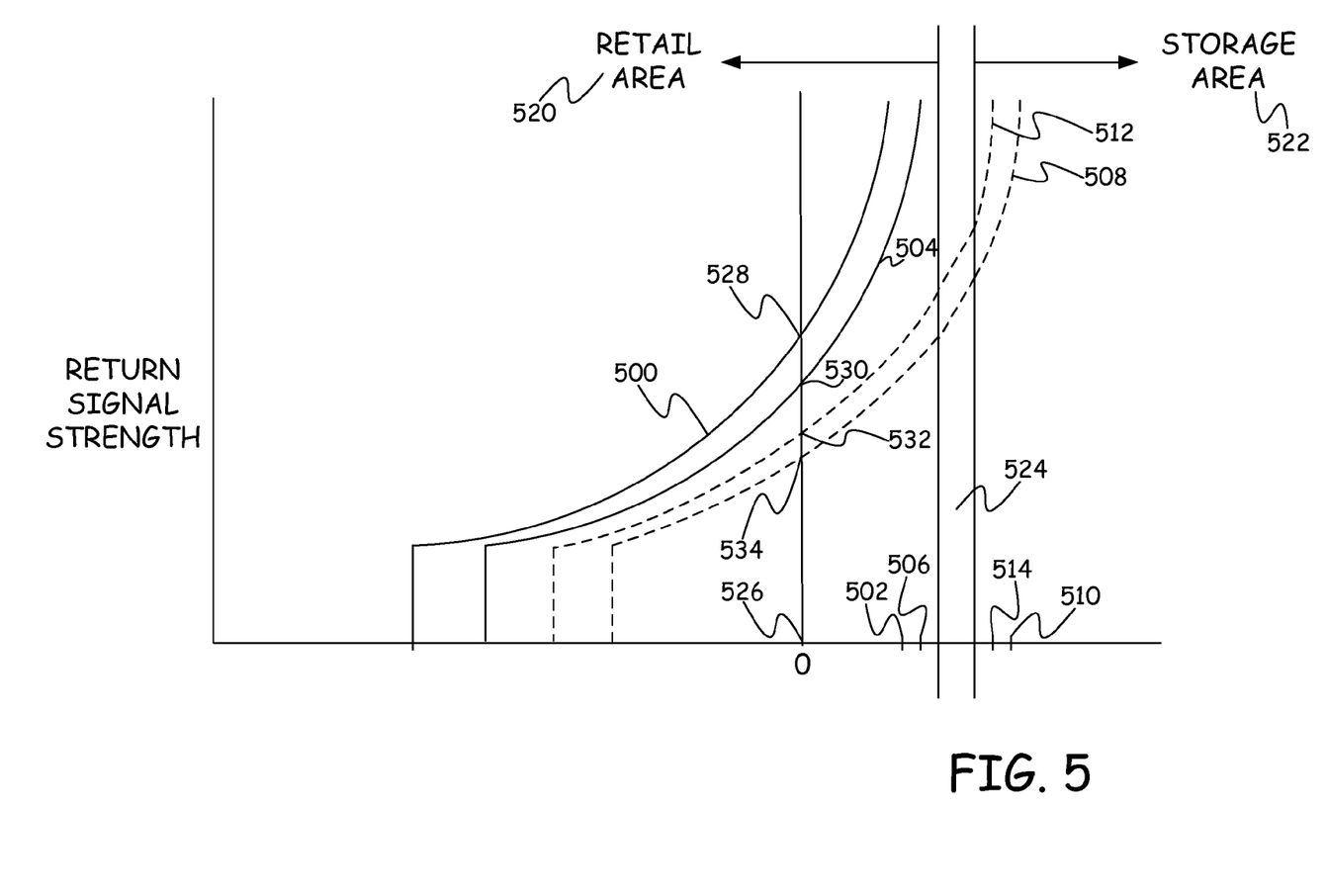
FIG. 5 is a graph of received signal strengths at different positions from a collection of RFID tags.

FIG. 5 provides graphs 500, 504, 508 and 512 of received signal strengths at various positions from a collection of RFID tags in a retail environment. Graph 500 is for an RFID tag placed on a shelf at a position 502. Graph 504 is for an RFID tag positioned on a product at location 506. Graph 508 is for an RFID tag placed on a shelf at position 510 and graph 512 is for an RFID tag placed on a product at position 514. Positions 502 and 506 are located in a retail area 520 and positions 510 and 514 are in a storage area 522. Retail area 520 is separated from storage area 522 by a wall 524. An RFID interrogator-reader is positioned at position 526.

At RFID interrogator-reader position 526, the radio signal from the RFID tag on the shelf at position 502 has a strength 528 and the radio signal from the RFID tag on the product at position 506 has a strength 530. Similarly, the radio signal from the RFID tag on the shelf at position 510 has a strength 534 and the RFID tag on the product at position 514 has a strength 532.

As can be seen in FIG. 5, strength 530 of the product RFID tag is closer to strength 528 of the shelf tag at position 502 than to strength 534 of the shelf tag at position 510. This indicates that the product RFID tag is located closer to the shelf tag at position 502 than to the shelf tag at position 510, thereby indicating that the product is in retail area 520 rather than storage area 522. Similarly, the strength 532 of the radio signal from the product RFID tag in position 514 is closer to the strength 534 of the structure RFID tag at position 510 than the strength 528 of the structure RFID tag at position 502. As a result, this indicates that the product at position 514 is closer to position 510 than position 502 and that the product is more likely in storage area 522 than retail area 520.

Figure 6:
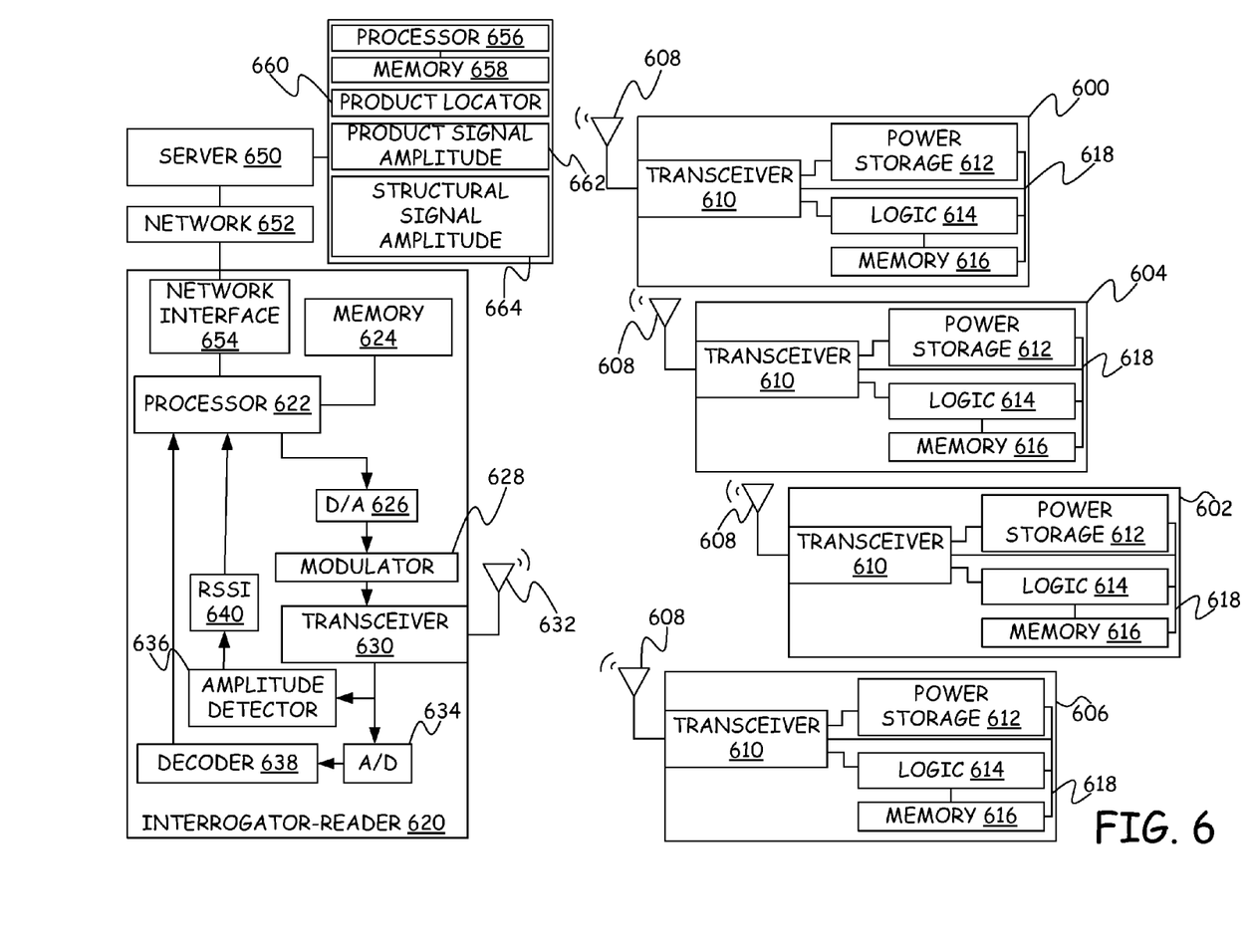
FIG. 6 is a block diagram of a system for locating products in accordance with one embodiment.
Figure 7:
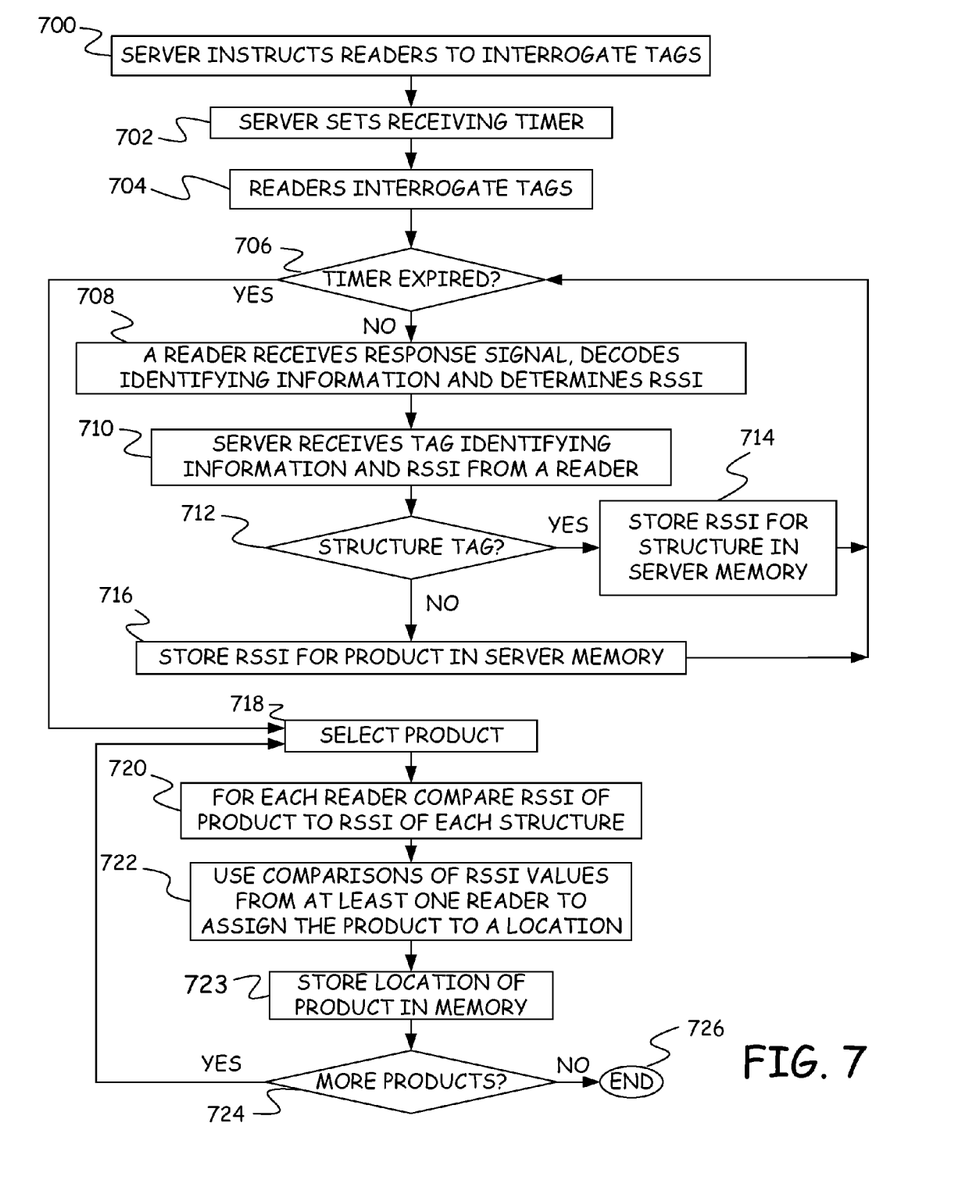
FIG. 7 is a flow diagram of a method of locating products in accordance with one embodiment.

FIG. 6 provides a block diagram of a system for determining a position of a product using a product RFID tag and two or more structure RFID tags. FIG. 7 provides a flow diagram of a method of locating a position of a product using the elements of FIG. 6.

In FIG. 6, structure RFID tags 600 and 602 are provided that are mounted to physical structures in one or both of the retail area and the storage area. For example, structure RFID tags 600 and 602 may be mounted to shelving units, other product support structures, or building support structures. In one embodiment, structure RFID tag 600 is mounted on a structure in a storage area or storage room, structure RFID tag 602 is mounted on a display structure in a retail space or sales floor, and a wall separates the storage area from the retail space. Product RFID tag 604 and 606 are designed to be mounted on products or product boxes. Although only two structure RFID tags and two product RFID tags are shown, those skilled in the art will recognize that more structure RFID tags and more product RFID tags may be used.

Each RFID tag 600, 602, 604 and 606, includes an antenna 608 and a transceiver 610. Transceiver 610 includes a receiver for receiving an interrogator signal through antenna 608 and for providing a portion of the signal to power storage 612. Power storage 612 uses the portion of the signal it receives to charge one or more capacitors, which are then discharged along power bus 618 to power logic 614, memory 616 and transceiver 610. Transceiver 610 also decodes the incoming signal and provides the decoded signal to power logic 614. Power logic 614 accesses instructions in memory 616 for processing the received signal and then provides data representing a response signal to transceiver 610. Transceiver 610 modulates the response signal and transmits it on antenna 608 to form a radio signal. In accordance with most embodiments, the response signal includes at least one identifier of the tag that is unique to the tag. In one embodiment, the response signal from structure RFID tag 600 includes an identifier associated with a location in a storage area and the response signal from structure RFID tag 602 includes an identifier associated with a location in a sales area.

Transceiver 610 found in product RFID tags 604 and 606 may be referred to as a product radio transceiver. Transceiver 610 in one of structure RFID tags 600 and 602 may be referred to as a storage area radio transceiver while transceiver 610 in the other of structure RFID tags 600 and 602 may be referred to as a sales area radio transceiver.

Although tags 600, 602, 604 and 606 are shown as passive tags in FIG. 6, in other embodiments, one or more of the tags may be active RFID tags.

The system of FIG. 6 also includes an RFID interrogator-reader 620, also referred to as RFID reader 620, which includes a processor 622, memory 624, digital-to-analog converter 626, modulator 628, transceiver 630 and antenna 632, which together cooperate to form interrogation signals for interrogating the RFID tags. In particular, processor 622 uses instructions in memory 624 to generate an interrogation signal that is converted from digital to analog by digital-to-analog converter 626 and then is modulated by modulator 628. The modulated signal is provided to transceiver 630, which then transmits the signal through antenna 632. Although FIG. 6 shows RFID reader 620 as including elements for generating an interrogation signal, in other embodiments, RFID reader 620 does not have such elements.

Transceiver 630 also receives response signals through antenna 632 from one or more RFID tags. Each response signal is provided to an analog-to-digital converter 634 and a radio signal amplitude detector 636. Analog-to-digital converter 634 converts the analog response signal into a digital signal, which is then decoded by decoder 638 to produce decoded values that are provided to processor 622. These decoded values include the identity of the RFID tag that sent the response signal. Amplitude detector 636 detects the amplitude of the response signal and this amplitude is then converted into an RSSI value by RSSI converter 640. The RSSI value is then provided to processor 622.

Processor 622 provides the identity of the RFID tag and the RSSI value of the response signal to a server 650 that is on a network 652 through a network interface 654. Network 652 may be a local area network, an intranet or the Internet. Server 650 includes a processor 656 and a memory 658 and in most embodiments is a computing device, for example. The identities of the product RFID tags, the RSSI values of those tags, and the identities of the RFID interrogator-readers that received the RFID signals are stored in product signal amplitudes 662 while the identities of structure RFID tags, the RSSI values of those tags, and the identities of the RFID interrogator-readers that received the RFID signals are stored in structure signal amplitudes 664. Memory 658 also contains computer-executable instructions representing a product locator 660 that when executed by processor 656 cause processor 656 to function as a product locator that can determine the location of various products based on the values in product signal amplitudes 662, and structure signal amplitudes 664.

Although only a single RFID interrogator-reader 620 is presented in FIG. 6, those skilled in the art will recognize that multiple RFID interrogator-readers such as RFID interrogator-reader 620 may be present in the system and may be connected to network 652 so as to communicate with server 650. Thus, server 650 can receive RFID identifiers and RSSI values from multiple RFID interrogator-readers.

To determine the location of products, server 650 first instructs the RFID interrogator-readers to interrogate the tags at step 700 of FIG. 7. Server 650 then sets a receiving timer at step 702. The receiving timer provides a cutoff time for RFID tags to respond to the interrogator signal and have their response signal processed by at least one RFID interrogator-reader.

At step 704, the RFID interrogator-reader(s) interrogate the tags by sending an interrogation signal through a transceiver 630 and an antenna 632.

At step 706, the server determines if the timer set in step 702 has expired. If it has not expired, an RFID interrogator-reader receives a response signal from at least one RFID tag, decodes the identifying information in the response signal and determines an RSSI value for the response signal at step 708.

At step 710, the RFID interrogator-reader provides the identifying information and the RSSI value to server 650, which receives the information.

At step 712, server 650 determines if the identifying information is for an RFID tag mounted to a structure or for an RFID tag mounted to a product. If the identifying information is for a structure RFID tag, the RSSI value received at step 710 is stored in memory 658 at step 714 as a structure signal amplitude 664. In addition to the RSSI value, an identifier for the structure and an identifier for the RFID interrogator-reader that received the signal are also stored at step 714. If the identifying information indicates that the RFID tag is a product RFID tag and not a structure RFID tag, the RSSI value for the response signal is stored at step 716 in product signal amplitude 662. In addition to the RSSI value, an identifier for the product and an identifier for the RFID interrogator-reader that received the signal are also stored at step 716.

After step 714 or step 716, the process of FIG. 7 returns to step 706 where the server determines if the timer has expired. If the timer has not expired, steps 708-716 are repeated for a new RFID response signal. When the timer has expired at step 706, the server selects a product at step 718 and at step 720 compares the RSSI value of the product to the RSSI of each structure RFID tag. In one embodiment, this involves determining the differences between the RSSI value of the product and the RSSI values of each structure RFID tag. In embodiments in which multiple RFID interrogator-readers are used, step 720 is repeated for the RSSI of the product tag signal and the RSSI of each structure tag signal determined by each RFID interrogator-reader. For example, if there were four RFID interrogator-readers, one product RFID tag and two structure RFID tags, eight differences would be determined at step 720, with two differences determined for each RFID interrogator-reader. Since each RFID interrogator-reader receives a different strength signal from the product RFID tag and from the structure RFID tags, the resulting RSSI values at each RFID interrogator-reader will be different resulting in different comparison values for each RFID interrogator-reader.

At step 722, the server uses the comparisons between the RSSI value of the product RFID tag and the RSSI values of the structure RFID tags from at least one RFID interrogator-reader to assign the product to a location. If a single RFID interrogator-reader is present, step 722 involves identifying the structure RFID tag that provides an RSSI value that is closest to the RSSI value of the product. Using the identity of the structure RFID tag, the server retrieves the location of the structure RFID tag and assigns the product to a location based on the location of the structure RFID tag. The location may be general, such as referring to the retail area or the storage area, or may be specific, such as referring to a particular shelving unit or a particular shelf to which the structure RFID tag is mounted.

If more than one RFID interrogator-reader provides RSSI values for the product and the structure RFID tag, the comparison in step 722 involves adding the differences between the RSSI values and the structure RFID tag values to determine a comparison value for each structure RFID tag as:

$$C_s = \sum_{i \in I} RSSI_{i,p} - RSSI_{i,s} \qquad \text{EQ. 1}$$

where $C_s$ is the comparison value for structure RFID tag s, I is the set of RFID interrogator-readers, $RSSI_{i,p}$ is the RSSI value provided by RFID interrogator-reader i for the product RFID tag p and $RSSI_{i,s}$ is the RSSI value provided by the RFID interrogator-reader i for structure RFID tag s. The comparison values, $C_s$, are then compared to each other and the smallest comparison value and its corresponding structure RFID tag is selected as being the closest to the product RFID tag. The location is then assigned to the product based on this closest structure RFID tag. As above, this location may be general such as the retail area or the storage area or may be specific to a particular shelving unit or to a particular shelf on a shelving unit.

After assigning a location to the product, server 650 stores the location at step 723 either in memory 658 or in a separate database on a separate server (not shown). The location stored for the product is an indication that the product is positioned near the structure where the closest structure RFID tag is positioned.

The process of FIG. 7 continues at step 724 where the server determines if there are more products in product signal amplitudes 662. If there are more products, server 650 selects a new product at step 718 and steps 720, 722 and 723 are repeated. When there are no more products in product signal amplitudes 662, server 650 ends the process at step 726.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
   receiving at least one structure signal strength for a respective signal generated by a passive tag on a structure, each received structure signal strength associated with a respective reader;
   receiving at least one second structure signal strength for a respective signal generated by a passive tag on a second structure, each received second structure signal strength associated with a respective reader;
   receiving at least one product signal strength for a respective signal generated by a passive tag on a product, each received product signal strength associated with a respective reader;
   storing an indication that the product is positioned near the structure by:
      determining if more than one reader received a respective signal generated by the passive tag on the product and for each reader that received a respective signal generated by the passive tag:
         determining a difference between the received product signal strength associated with the reader and the received structure signal strength associated with the reader and determining a difference between the received product signal strength associated with the reader and the received second structure signal strength associated with the reader; and
      using the differences associated with the readers that received respective signals generated by the passive tag to determine that the product is closer to the structure than the second structure.

2. The computer-implemented method of claim 1 wherein the structure and the second structure are separated by a building wall.

3. The computer-implemented method of claim 1 wherein storing an indication that the product is positioned near the structure comprises storing an indication that the product is positioned in a backroom rather than a retail space.

4. The computer-implemented method of claim 1 wherein the structure comprises a shelf that supports products.

5. The computer-implemented method of claim 1 wherein the structure comprises a back panel located above and at a back of a shelf that supports products.

6. A system comprising:
   a passive merchandise tag on a piece of merchandise;
   a passive structure tag on a merchandise support structure;
   a tag reader that receives signals from the passive merchandise tag and the passive structure tag and identifies a strength of the signal received from the passive merchandise tag and a strength of the signal received from the passive structure tag;
   a second tag reader that receives signals from the passive merchandise tag and the passive structure tag and identifies a strength of the signal received from the passive merchandise tag and a strength of the signal received from the passive structure tag; and
   a computing device that:
      receives from the tag reader the strength of the signal received from the passive merchandise tag and the strength of the signal received from the passive structure tag;
      receives from the second tag reader the strength of the signal received from the passive merchandise tag by the second tag reader and the strength of the signal received from the passive structure tag by the second tag reader; and
      identifies a location of the piece of merchandise by:
         determining a difference of the strength of the signal received from the passive merchandise tag and the strength of the signal received from the passive structure tag by the tag reader;
         determining a difference of the strength of the signal received from the passive merchandise tag and the strength of the signal received from the passive structure tag by the second tag reader; and
         summing the differences to form a comparison value that indicates the location of the piece of merchandise.

7. The system of claim 6 wherein the identified location of the piece of merchandise comprises a sales floor.

8. The system of claim 6 wherein the identified location of the piece of merchandise comprises a store area.

9. The system of claim 6 wherein the identified location of the piece of merchandise comprises a shelf.

10. The system of claim 6 wherein the merchandise support structure comprises a shelving unit.

11. A retail store comprising:
    a product radio transceiver mounted on a product;
    a storage area radio transceiver mounted in a storage area;
    a sales area radio transceiver mounted in a sales area;
    a radio signal amplitude detector providing amplitudes of signals from the product radio transceiver, the storage area radio transceiver, and the sales area radio transceiver, the signal from the product radio transceiver comprising, wherein the signal from the product radio transceiver comprises an identifier associated with the product, the signal from the storage area radio transceiver comprises an identifier associated with a location in the storage area, and the signal from the sales area radio transceiver comprises an identifier associated with a location in the sales area; and
    a second radio signal amplitude detector providing second amplitudes of signals from the product radio transceiver, the storage area radio transceiver, and the sales area radio transceiver;
    a product locator identifying a location of the product in the retail store by:
       determining a difference between the amplitude of the signal from the product radio transceiver and the amplitude of the signal from the storage area radio transceiver;
       determining a difference between the amplitude of the signal from the product radio transceiver and the amplitude of the signal from the sales area radio transceiver;
       determining a difference between the second amplitude of the signal from the product radio transceiver and the second amplitude of the signal from the storage area radio transceiver;
       determining a difference between the second amplitude of the signal from the product radio transceiver and the second amplitude of the signal from the sales area radio transceiver; and
       using the differences to determine a comparison value indicative of the location of the product in the retail store.

12. The retail store of claim 11 wherein the storage area is separated from the sales area by a wall.

13. The retail store of claim 11 wherein the storage area radio transceiver is mounted on a shelving unit and the sales area radio transceiver is mounted on a second shelving unit.

14. The retail store of claim 13 wherein the storage area radio transceiver is mounted on a back panel of a shelving unit.

* * * * *